United States Patent
Schmidt et al.

(10) Patent No.: US 11,211,831 B2
(45) Date of Patent: Dec. 28, 2021

(54) SYSTEM HAVING PRIMARY CONDUCTOR SECTIONS SUPPLIED WITH ALTERNATING CURRENT BY RESPECTIVE FEED-IN DEVICES, AND HAVING AT LEAST ONE MOBILE PART INCLUDING A FREQUENCY-ACQUISITION DEVICE, AND METHOD FOR OPERATING SUCH A SYSTEM

(71) Applicant: SEW-EURODRIVE GMBH & CO. KG, Bruchsal (DE)

(72) Inventors: Josef Schmidt, Graben-Neudorf (DE);
Thomas Schäfer, Karlsdorf-Neuthard (DE); Jens Schäfer, Graben-Neudorf (DE); Jochen Mahlein, Karlsruhe (DE); Ulrich Stockenberger, Forst (DE)

(73) Assignee: SEW-EURODRIVE GMBH & CO. KG, Bruchsal (DE)

( * ) Notice: Subject to any disclaimer, the term of this patent is extended or adjusted under 35 U.S.C. 154(b) by 0 days.

(21) Appl. No.: 16/769,744

(22) PCT Filed: Nov. 8, 2018

(86) PCT No.: PCT/EP2018/025285
§ 371 (c)(1),
(2) Date: Jun. 4, 2020

(87) PCT Pub. No.: WO2019/110141
PCT Pub. Date: Jun. 13, 2019

(65) Prior Publication Data
US 2020/0389056 A1    Dec. 10, 2020

(30) Foreign Application Priority Data
Dec. 4, 2017  (DE) ................ 10 2017 011 163.4

(51) Int. Cl.
*H02J 50/10*  (2016.01)
*H02J 50/80*  (2016.01)
(Continued)

(52) U.S. Cl.
CPC .............. *H02J 50/40* (2016.02); *B60L 53/12* (2019.02); *H02J 50/10* (2016.02); *H02J 50/12* (2016.02); *H02J 50/80* (2016.02)

(58) Field of Classification Search
CPC . B60L 53/12; H02J 50/10; H02J 50/12; H02J 50/40; H02J 50/80
(Continued)

(56) References Cited

U.S. PATENT DOCUMENTS

2013/0221913 A1*  8/2013  Kim ................... H02J 7/0044
                                                320/108
2014/0094116 A1    4/2014  Walley et al.
(Continued)

FOREIGN PATENT DOCUMENTS

WO    2008051611 A2    5/2008

*Primary Examiner* — William Hernandez
(74) *Attorney, Agent, or Firm* — Carter DeLuca & Farrell LLP

(57) ABSTRACT

In a system having primary conductor sections supplied with alternating current by respective feed-in devices, and having at least one mobile part, and in a method for operating such a system, in which the mobile part has a secondary winding, in particular on its underside, which is able to be, in particular is, inductively coupled with one of the primary conductor sections, the feed-in devices inject respective alternating currents of different frequencies into the primary conductor sections, and the mobile part has a device for acquiring the frequency of the alternating current injected into the primary conductor section inductively coupled with the secondary winding.

23 Claims, 1 Drawing Sheet

(51) Int. Cl.
    *H02J 50/40*         (2016.01)
    *H02J 50/12*         (2016.01)
    *B60L 53/12*         (2019.01)

(58) Field of Classification Search
    USPC ............................................................ 307/104
    See application file for complete search history.

(56) References Cited

U.S. PATENT DOCUMENTS

| | | | |
|---|---|---|---|
| 2015/0042168 A1 | 2/2015 | Widmer | |
| 2015/0048688 A1* | 2/2015 | Yamakawa | H02M 7/5387 307/104 |
| 2016/0111208 A1* | 4/2016 | Park | H01F 27/006 307/104 |

* cited by examiner

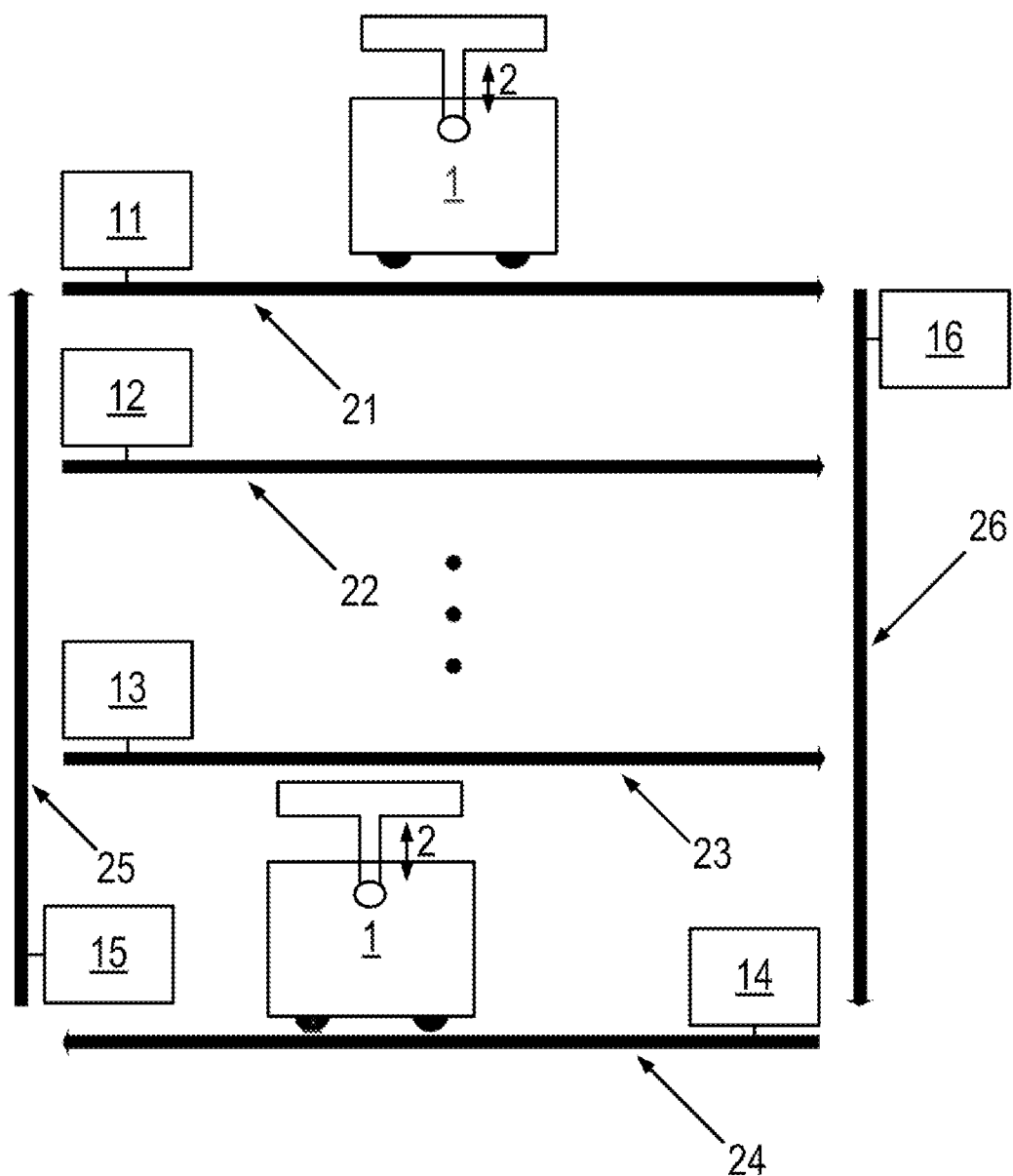

SYSTEM HAVING PRIMARY CONDUCTOR SECTIONS SUPPLIED WITH ALTERNATING CURRENT BY RESPECTIVE FEED-IN DEVICES, AND HAVING AT LEAST ONE MOBILE PART INCLUDING A FREQUENCY-ACQUISITION DEVICE, AND METHOD FOR OPERATING SUCH A SYSTEM

FIELD OF THE INVENTION

The present invention relates to a system having primary conductor sections supplied with alternating current by respective feed-in devices, and having at least one mobile part, and it relates to a method for operating such a system.

BACKGROUND INFORMATION

In certain conventional systems, it is possible to inductively supply a mobile part from a primary conductor installed on the floor.

SUMMARY

Example embodiments of the present invention improve the reliability during an operation of a system.

According to example embodiments of the present invention, a system includes primary conductor sections supplied with alternating current by respective feed-in devices, and at least one mobile part. The mobile part has a secondary winding, in particular on its underside, which is able to be, in particular is, inductively coupled with one of the primary conductor sections. The feed-in devices inject respective alternating currents having different frequencies into the primary conductor sections, and the mobile part has a device for acquiring the frequency of the alternating current injected into the primary conductor section inductively coupled with the secondary winding.

This has the advantage that the determination of the frequency makes it possible to determine the position range in which the mobile part is located. On the one hand, a rough determination of the position is possible in this manner and the position determined by a position determination device is able to be checked on the other hand. The quality factor of the secondary-side oscillating circuit is configured such that a plurality of such frequencies having sufficiently large spacing from one another may be used. Thus, an identification of the position ranges is possible with the aid of the frequencies.

According to example embodiments, the feed-in devices function as a current source. This is considered advantageous insofar as even during a simultaneous supply of multiple mobile parts by the same primary conductor, the same power is transmittable to the respective mobile part because the alternating magnetic field generated by the primary conductor is a function of the current in the primary conductor.

According to example embodiments, the mobile part has an energy accumulator for buffering peak power demands and/or for the at least intermittent travel away from the primary conductor sections. This offers the advantage that buffering of peak power demands and/or an at least intermittent travel of the mobile part away from the primary conductor sections is/are possible. As a result, the mobile part is freely movable on the driving surface and is able to move independently of the stationary primary conductor sections.

According to example embodiments, a capacitance is connected in parallel and/or in series to the secondary winding, and the oscillating circuit formed in this manner has a resonant frequency, the oscillating circuit formed in this manner in particular having a resonant frequency and a quality factor. This has the advantage that the quality factor of the oscillating circuit is dimensioned so that a sufficiently satisfactory resonant inductive transmission of electric power is possible in practice even if the used frequency deviates from the frequency injected into the primary conductor. Thus, frequencies of a frequency band that are distributed around the resonant frequency yet still allow sufficient power to be transmitted, in particular more than 50% of the power transmittable at the resonant frequency, are able to be used.

According to example embodiments, the mobile part has a control which is connected to the device for a data exchange, and/or the mobile part is provided with a position determination device, which is connected to the control for a data exchange. This offers the advantage that, firstly, the determined position and, secondly, the determined frequency are conveyed to the control. As a result, the control has the ability to check, by comparing the determined position and the position range stored for the frequency in the memory of the control, whether the position has been correctly determined. A warning or an error report is able to be output as a function of the result.

According to example embodiments, the frequency spacing of the respective frequency from the resonant frequency decreases monotonically with the reciprocal value of a power demand allocated to the respective primary conductor section, the power demand allocated to the respective primary conductor section in particular being the average power expected when driving along the respective primary conductor section or the peak power expected when driving along the respective primary conductor. This has the advantage that a primary conductor section in which the mobile part has a greater power demand, for example, because it has to operate a plurality of drives at the same time, is allocated a frequency without spacing or at least with a smaller spacing from the resonant frequency than a primary conductor section in which less of a power demand exists, such as during simple driving at a constant speed.

According to example embodiments, the frequency spacing of the respective frequency from the resonant frequency is lower with an increasing number of drives consuming electrical power, that is to say, in particular, the frequency spacing in a first primary conductor section is smaller than in a second primary conductor section if a greater number of drives is simultaneously operated in the first primary conductor section than in the second primary conductor section. This has the advantage that all frequencies are actually situated in the resonance range of the oscillating circuit but the frequency that has the greatest power transmission is provided for the particular primary conductor section that— when used by the mobile part—has the greatest power demand, in particular, operates two drives simultaneously.

According to example embodiments, the frequencies of the alternating currents injected by the feed-in devices into the primary conductor sections are graduated in increments ranging from one-thousandth to one-hundredth of the resonant frequency. This offers the advantage that sufficient spacing is provided to allow for a reliable identification, and an adequate number of frequencies in the resonant range is also able to be provided, as required in particular if large systems are involved.

According to an example embodiment of the present invention, in a method for determining the position of a mobile part in a system, in particular, a system having storage shelving: in a first method step, in particular during an initial operation, a respective frequency value for respective position ranges, in particular aisles of the system, is stored in a memory of the mobile part; in a second method step, in particular during an operation following the initial operation, the frequency of the voltage induced in the secondary winding of the mobile part by a primary conductor section is determined and the position range, in particular the aisle, is determined on that basis; and in a third method step, in particular during an operation following the initial operation, the position of the mobile part within the position range determined in the second method step is determined on an optical basis with the aid of a position determination device, in particular by evaluating the signals of a laser scanner mounted on the mobile part and/or by evaluating images recorded by a camera mounted on the mobile part.

This has the advantage that a position determination in optically-based systems is possible even if there is no optical difference from another position range. This is so because the position range is uniquely identified by the frequency inasmuch as each of the position ranges that optically appears to be of the same type to the sensor of the mobile part, e.g., the laser scanner and/or the camera, has a frequency in the primary conductor section associated with the position range that is bijectively allocated to the position range.

According to an example embodiment of the present invention, in a method for operating a system: in a first method step, a respective frequency value for respective position ranges is stored in a memory of the mobile part; in a second method step, the position of the mobile part is determined with the aid of a position determination device; and in a third method step, the frequency of the voltage induced in the secondary winding of the mobile part by a primary conductor section is determined and compared with the frequency value for the determined position stored in the memory, in particular so that a warning and/or an error is/are indicated and/or forwarded if a predefined measure of a deviation is exceeded.

This offers the advantage that it is possible to check the position determined by the position determination device, which means that greater safety is achievable.

Further features and aspects of example embodiments of the present invention are described in greater detail below with reference to the appended FIGURE.

BRIEF DESCRIPTION OF THE DRAWING

FIG. 1 schematically illustrates a system according to an example embodiment of the present invention.

DETAILED DESCRIPTION

In FIG. 1, a system is illustrated which has a plurality of primary conductor sections (21, 22, 23, 24, 25, 26), which are supplied by a feed-in device (11, 12, 13, 14, 15, 16) in each case.

As illustrated in FIG. 1, mobile parts 1 are movable along the primary conductor sections.

Mobile part 1 has a linear drive 2, which allows for a height adjustment of a carrier plate situated on the upper side of the mobile part. Linear drive 2 is equipped with an electric motor.

In addition, mobile part 1 includes a control, which actuates a traction drive of mobile part 1. The traction drive likewise has at least one electric motor.

A secondary winding is situated at the underside of mobile part 1, which is able to be inductively coupled with one of the primary conductor sections to which a medium-frequency alternating current is applied. A capacitance is connected in series and/or in parallel to the secondary winding so that an oscillating circuit is formed from which an energy accumulator of mobile part 1 is able to be supplied and/or the drives of the mobile part such as a traction drive and a linear drive are able to be supplied. This ensures an inductive supply.

The quality factor of the oscillating circuit is selected so that a frequency range having an extension of 1% around the resonant frequency will still be tolerated. As a result, the respective primary conductor section is able to be energized using a frequency from this frequency range, and at least 50% of the power that is transmittable at the exact resonant frequency is transmittable nevertheless. Therefore, the primary conductor sections are able to be energized using a frequency that is characteristic of the primary conductor sections.

For example, the used frequencies are spaced apart from one another by 100 Hertz in each case. The positioning of the primary conductor sections and the particular associated frequency are stored in the control of mobile part 1. The control is therefore capable of checking whether the position of mobile part 1 determined with the aid of a position determination system is correct.

For this purpose, mobile part 1 has a position determination system, which has a camera installed on mobile part 1 by which information carriers, e.g., one-dimensional codes or two-dimensional codes, in particular bar codes or QR codes situated in locations in the system, are detected and evaluated. Each information carrier includes an identifying datum so that the position detection system determines the position of the mobile part based on the detected information carriers and the information detected therefrom, and forwards it to the control of the mobile part. Also stored in the memory of the control is the position range of the respective primary conductor sections together with the frequency associated with each of the position ranges, i.e., primary conductor sections.

As a result, it is verifiable whether the position determined by the position determination system is incorrect. Toward this end, the frequency of the alternating current induced in the secondary winding is determined with the aid of a frequency determination device and the frequency value acquired in the process is forwarded to the control. The frequency value determined in this manner is compared to the particular frequency value stored in the memory for the respective position range which encompasses the position determined by the position determination system. If the two frequency values do not agree, a warning and/or error message is/are output and/or forwarded by the control via a data-exchange connection.

Even after an emergency power off, a power failure or a restart of the mobile part, the mobile part must first determine its position. However, if this is impossible because the position determination system is not available or not operative or is unable to detect information, then the frequency value of the alternating current injected into the primary conductor section is first determined and the associated position range ascertained therefrom. By moving mobile part 1 along the primary conductor section beyond its end, mobile part 1 then encounters a different primary conductor section, e.g., the primary conductor section allocated to a main path. After determining the frequency allocated to this other primary conductor section and determining the associated position range stored in the memory, it is therefore possible to determine the position with sufficient precision for the movement in the system.

The feed-in devices function as a current source in each case, and in particular inject alternating current into the respective primary conductor section.

As illustrated in FIG. 1, first primary conductor section 21 is installed on the floor along a first aisle of the system, and a first feed-in device 11 injects alternating current having a first frequency into primary conductor section 21.

In the same manner, second primary conductor section 22 is installed on the floor along a second aisle of the system, which in particular is aligned in parallel with the first aisle, and a second feed-in device 12 injects alternating current having a second frequency into primary conductor section 22.

In the same manner, third primary conductor section 23 is installed on the floor along a third aisle of the system, which in particular is aligned in parallel with the first aisle, and a third feed-in device 13 injects alternating current having a third frequency into primary conductor section 23.

In the same manner, fourth primary conductor section 24 is installed on the floor along a fourth aisle of the system, which in particular is aligned in parallel with the first aisle, and a fourth feed-in device 12 injects alternating current having a fourth frequency into primary conductor section 24.

At a respective first end of the first through fourth aisles, the aisles terminate in a transversely aligned first main path via which mobile parts 1 are able to be guided to the aisles.

At a respective other end of the first through the fourth aisles, the aisles terminate in a transversely aligned further main path via which mobile parts 1 are able to be guided out of the aisles.

Fifth primary conductor section 25 is installed on the floor along the first main path of the system, and fifth feed-in device 15 injects alternating current having a fifth frequency into primary conductor section 25.

Sixth primary conductor section 26 is installed on the floor along the second main path of the system, and sixth feed-in device 16 injects alternating current having a sixth frequency into primary conductor section 26.

For example, 25 kHz is used as the resonant frequency, and the quality factor of the oscillating circuit is such that in a positioning of mobile part 1 featuring an optimal inductive coupling over one of the primary conductor sections, more than 50% of the maximum power is transmittable to the mobile part, even if the used frequency has a random value from the frequency range of 24 kHz to 26 kHz. In particular, frequencies that are graduated in 100 Hz increments with respect to one another, e.g., 25 kHz, 24.9 kHz, 25.1 kHz, 24.8 kHz, 25.2 kHz, 25.3 kHz, etc., are used as the first through sixth frequency.

While passing through the first and second main paths, only the traction drive of mobile part 1 is operated but not linear drive 2. The power requirement is therefore lower than in the aisles where not only the traction drive but also linear drive 2 is operated, at least intermittently. This makes it possible to adjust the height of the carrier plate while driving through the aisles even before the respective next workstation is reached. However, this also increases the power requirement in comparison with an operation using just the traction drives.

For this reason, frequency values are provided as the first through fourth frequencies that have a smaller spacing from the resonant frequency, in particular frequency-wise, than the fifth frequency and also the sixth frequency.

According to example embodiments of the present invention, the frequency values of the primary conductor sections are thus adapted to the required power demands in each case. The greater the power demand, the smaller the frequency spacing of the respective frequency from the resonant frequency. Expressed in general terms, the frequency spacing from the resonant frequency is a monotonically rising function of the reciprocal value of the power demand.

For example, an expected average power value or alternatively an expected peak value of power is used as the power demand.

According to example embodiments of the present invention, it is possible to distinguish the different aisles based on the frequency allocated to the respective aisle, in particular the individual frequency. These aisles may thus have exactly the same configuration. Even if other position determination devices are employed such as image-based or camera-based systems or other optically based systems, it is therefore possible to determine the position because the individual aisle is identified by the supplementary information of the frequency.

As a result, the system described herein is considered advantageous especially for systems in which laser scanners are mounted on the mobile parts and the position determination is carried out according to the SLAM method since this method then sets up an image of the environment for itself using cameras or laser scanners. However, when aisles are configured to be optically exactly identical, the aisle is identified via the frequency, and the target position, e.g., a storage location, is then approached using the optically-based system.

In further exemplary embodiments of the present invention, a different position determination system is additionally or alternatively used, in particular an odometric system and/or a GPS-type system and/or an image evaluation system. This makes it possible to achieve better accuracy and a more rapid position determination, in particular when such systems are combined.

In additional exemplary embodiments of the present invention, a resonant frequency of, for example, 50 kHz is used, with the frequencies then being able to be spaced apart from one another in, e.g., 200 Hz increments.

In further exemplary embodiments of the present invention, a resonant frequency f_res is used, which has a value of, for example, between 10 kHz and 1000 kHz, and the frequencies are able to be spaced apart from one another using increments that amount to between one-thousandth and one-hundredth of the resonant frequency.

LIST OF REFERENCE NUMERALS

1 mobile part
2 linear drive, in particular lifting mechanism
11 feed-in device
12 feed-in device
13 feed-in device
14 feed-in device
15 feed-in device
16 feed-in device
21 primary conductor section
22 primary conductor section
23 primary conductor section
24 primary conductor section
25 primary conductor section
26 primary conductor section

The invention claimed is:

1. A system, comprising:
    primary conductor sections;
    feed-in devices, each feed-in device adapted to supply a respective primary conductor section with alternating current of a different frequency; and
    at least one mobile part, having a secondary winding adapted to inductively couple with one of the primary conductor sections and having a device adapted to acquire the frequency of the alternating current injected into the primary conductor section inductively coupled with the secondary winding.

2. The system according to claim 1, wherein the secondary winding is provided on an underside of the mobile part.

3. The system according to claim 1, wherein the secondary winding of the mobile part is inductively coupled with one of the primary conductor sections.

4. The system according to claim 1, wherein the feed-in devices are arranged as current sources.

5. The system according to claim 1, wherein the mobile part includes an energy accumulator adapted to buffer peak power demands and/or adapted to allow for at least intermittent travel away from the primary conductor sections.

6. The system according to claim 1, wherein a capacitance is connected in parallel and/or in series to the secondary winding, and a resulting oscillating circuit has: (a) a resonant frequency; and/or (b) a resonant frequency and a quality factor.

7. The system according to claim 6, wherein a frequency spacing of the respective frequency from the resonant frequency decreases monotonically with a reciprocal value of a power demand allocated to the respective primary conductor section.

8. The system according to claim 7, wherein the power demand allocated to the respective primary conductor section is an average power expected when driving along the respective primary conductor section or a peak power expected when driving along the respective primary conductor section.

9. The system according to claim 6, wherein a frequency spacing of the respective frequency from the resonant frequency is lower with an increasing number of drives consuming electrical power.

10. The system according to claim 9, wherein the frequency spacing in a first primary conductor section is smaller than in a second primary conductor section if a greater number of drives is simultaneously operated in the first primary conductor section than in the second primary conductor section.

11. The system according to claim 6, wherein frequencies of the alternating currents injected by the feed-in devices into the primary conductor sections are graduated in increments ranging from one-thousandth to one-hundredth of the resonant frequency.

12. The system according to claim 1, wherein the mobile part includes a control device connected to frequency acquisition device for a data exchange, and/or the mobile part includes a position determination device connected to a control device for a data exchange.

13. A method for determining a position of a mobile part in a system, as recited in claim 1, comprising:
    during an initial operation, storing in a memory of the mobile part, a respective frequency value for respective position ranges of the system;
    after the initial operation, determining a frequency of a voltage induced in the secondary winding of the mobile part by a primary conductor section and determining, based on the determined frequency, the position range of the mobile part; and
    after the initial operation, determining a position of the mobile part within the determined position range on an optical basis in accordance with a position determination device.

14. The method according to claim 13, wherein the system further includes storage shelving.

15. The method according to claim 13, wherein the position ranges correspond to aisles of the system.

16. The method according to claim 13, wherein the position of the mobile part is determined by evaluating signals of a laser scanner mounted on the mobile part and/or by evaluating images recorded by a camera mounted on the mobile part.

17. A method for operating a system, as recited in claim 1, comprising:
    storing, in a memory of the mobile part, a respective frequency value for respective position ranges;
    determining a position of the mobile part in accordance with a position determination device; and
    determining a frequency of a voltage induced in the secondary winding of the mobile part by a primary conductor section and comparing the determined frequency with the frequency value for the determined position stored in the memory, so that a warning and/or an error is indicated and/or forwarded if a predefined measure of a deviation is exceeded.

18. The system according to claim 1, wherein a position of the mobile part is determinable based on the acquired frequency of the alternating current injected into the primary conductor section inductively coupled with the secondary winding.

19. The system according to claim 1, wherein a position range of the mobile part is determinable based on the acquired frequency of the alternating current injected into the primary conductor section inductively coupled with the secondary winding.

20. The system according to claim 1, wherein the mobile part includes a position determination device adapted to determine a position of the mobile part based on the acquired frequency of the alternating current injected into the primary conductor section inductively coupled with the secondary winding.

21. The system according to claim 1, wherein the mobile part includes a position determination device adapted to determine a position range of the mobile part based on the acquired frequency of the alternating current injected into the primary conductor section inductively coupled with the secondary winding.

22. The system according to claim 21, wherein the position determination device includes an optical device adapted to detect and evaluate information carriers to determine a position of the mobile part based on the determined position range and the detected and evaluated information carriers.

23. A system, comprising:
    primary conductor sections;
    feed-in devices, each feed-in device adapted to supply a respective primary conductor section with alternating current of a different frequency; and
    at least one mobile part, having a secondary winding adapted to inductively couple with one of the primary conductor sections and having a device adapted to determine the frequency of the alternating current injected into the primary conductor section inductively coupled with the secondary winding.

\* \* \* \* \*